United States Patent
Pianin et al.

(10) Patent No.: US 11,531,366 B2
(45) Date of Patent: Dec. 20, 2022

(54) INTEGRATED CIRCUIT WITH CLOCK GAPPING

(71) Applicant: Cisco Technology, Inc., San Jose, CA (US)

(72) Inventors: Laura K. Pianin, Cambridge, MA (US); Luke R. Leonard, San Luis Obispo, CA (US); Wesley D. Viner, San Jose, CA (US); Guanru Wang, Auburn, MI (US); Anthony N. Torza, Oakland, CA (US); James A. Markevitch, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 119 days.

(21) Appl. No.: 17/248,356

(22) Filed: Jan. 21, 2021

(65) Prior Publication Data

US 2022/0229463 A1  Jul. 21, 2022

(51) Int. Cl.
  *G06F 1/08* (2006.01)
  *G06F 1/324* (2019.01)
(52) U.S. Cl.
  CPC ............... *G06F 1/08* (2013.01); *G06F 1/324* (2013.01)
(58) Field of Classification Search
  CPC ................................ G06F 1/08; G06F 1/324
  See application file for complete search history.

(56) References Cited

U.S. PATENT DOCUMENTS

| | | | |
|---|---|---|---|
| 6,501,809 B1* | 12/2002 | Monk | H04J 3/0632 375/372 |
| 6,895,520 B1 | 5/2005 | Altmejd et al. | |
| 7,844,875 B2 | 11/2010 | Jun et al. | |
| 9,270,599 B1 | 2/2016 | Nagarajan et al. | |
| 9,766,686 B2 | 9/2017 | Wang et al. | |
| 2007/0291888 A1 | 12/2007 | Mateosky et al. | |
| 2010/0192003 A1* | 7/2010 | Weizeorick | H04J 3/062 713/500 |
| 2012/0087201 A1* | 4/2012 | Moon | G11C 7/222 365/233.18 |
| 2014/0095909 A1* | 4/2014 | Turullols | G06F 1/324 713/322 |
| 2014/0266339 A1 | 9/2014 | Azenkot et al. | |
| 2020/0166962 A1* | 5/2020 | Ponceleon | G06F 1/14 |

OTHER PUBLICATIONS

Silicon Laboratories, "Introduction To Gapped Clocks And PLLs" Dec. 2010, 14 pages.

* cited by examiner

*Primary Examiner* — Zahid Choudhury
(74) *Attorney, Agent, or Firm* — Patterson + Sheridan, LLP (57) ABSTRACT

A method that includes determining a first clock gap for a first block of an integrated circuit based on a performance factor of the first block or an external factor and adjusting a clock signal to the first block based on the first clock gap. The method also includes determining a second clock gap for a second block of the integrated circuit based on (i) the first clock gap and (ii) a performance factor of the second block or the external factor. The second clock gap is different from the first clock gap. The method further includes adjusting the clock signal to the second block based on the second clock gap.

20 Claims, 3 Drawing Sheets

INTEGRATED CIRCUIT WITH CLOCK GAPPING

TECHNICAL FIELD

Embodiments presented in this disclosure generally relate to clock management in integrated circuits. More specifically, embodiments disclosed herein relate to clock gapping for different circuit blocks of an integrated circuit.

BACKGROUND

Electrical power consumption is an important consideration during integrated circuit (IC) design. Limiting or reducing the power consumption of an IC has beneficial effects on the environment and utility costs. IC power consumption, however, has been steadily increasing. Additionally, as IC power consumption increases, the IC needs more cooling to function properly. Increased cooling needs further increase the power consumption related to the IC. For example, larger fans may be activated for longer durations to cool the IC, which results in additional electrical power consumption.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes determining a first clock gap for a first block of an integrated circuit based on a performance factor of the first block or an external factor and adjusting a clock signal to the first block based on the first clock gap. The method also includes determining a second clock gap for a second block of the integrated circuit based on (i) the first clock gap and (ii) a performance factor of the second block or the external factor. The second clock gap is different from the first clock gap. The method further includes adjusting the clock signal to the second block based on the second clock gap.

Example Embodiments

This disclosure describes using clock gapping to reduce the power consumption of an integrated circuit (IC), in certain embodiments. Generally, a controller introduces clock gaps into the clock signals communicated to different circuit blocks of the IC by suppressing one or more clock edges or pulses in the clock signals. The controller may determine the clock gap for a circuit block based on one or more factors such as, for example, IC temperature, data rate of the circuit block, and user input. The clock gaps reduce the effective clock rate of the clock signal, which reduces the electrical power consumption of the IC in certain embodiments. Additionally, the IC includes one or more shims that allow data communication between circuit blocks that have different effective clock rates or clock gapping. As a result, the shims allow different circuit blocks to communicate with one another even though the controller uses different clock gapping for these circuit blocks.

Figure 1:
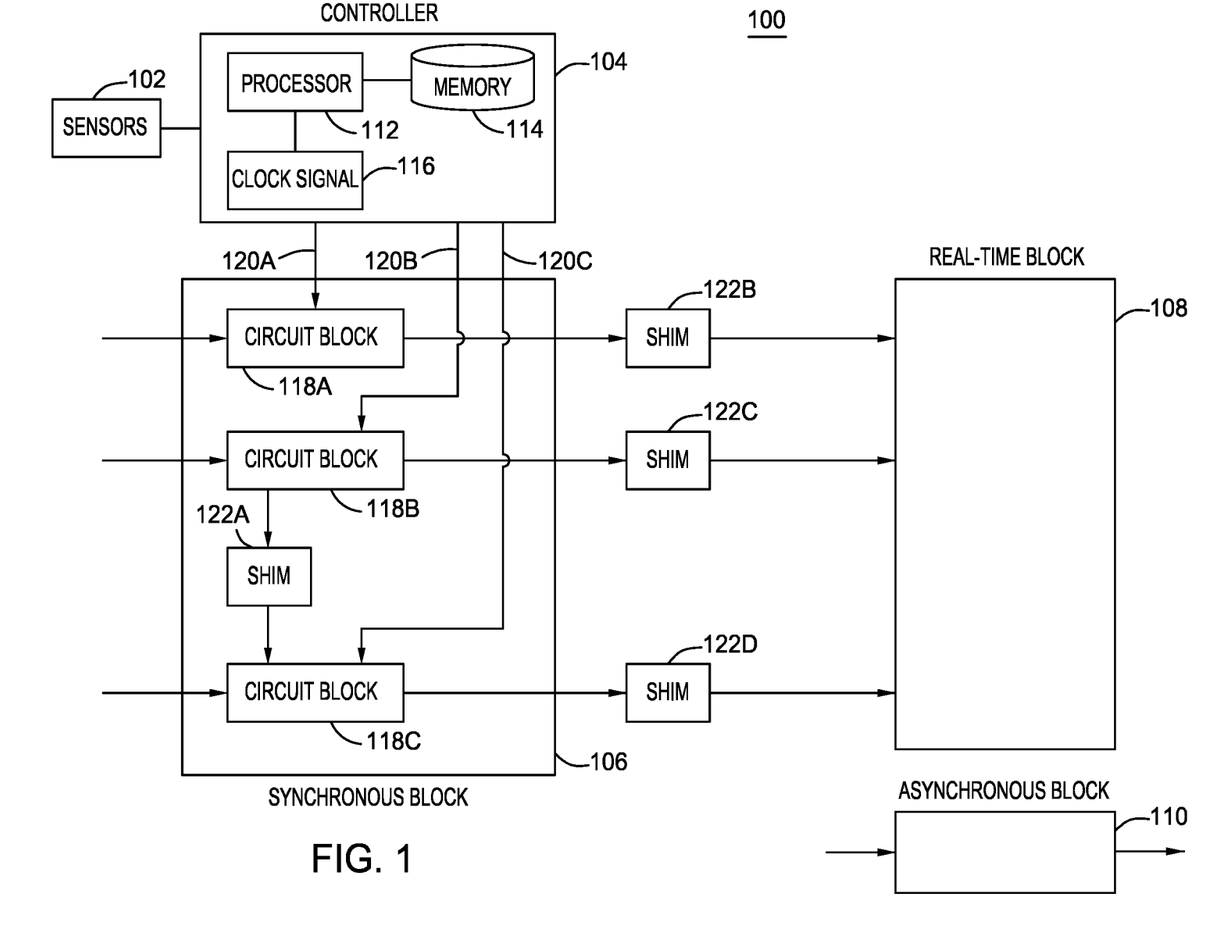
FIG. 1 illustrates an example system.

FIG. 1 illustrates an example system 100. As seen in FIG. 1, the system 100 includes one or more sensors 102, a controller 104, a synchronous block 106, a real-time block 108, and an asynchronous block 110. Generally, the system 100 may be a circuit, such as an IC. The components of the circuit may be designed and configured to perform desired functions. The controller 104 introduces clock gaps into the clock signals used to control certain components of the circuit. In this manner, the controller 104 reduces the effective clock rate for these components. In particular embodiments, by reducing the effective clock rate of these components, the electrical power consumption of the system 100 is reduced.

The sensors 102 detect certain characteristics of the system 100. For example, the sensors 102 may include any suitable number of temperature sensors that detect the temperature of the system 100 or the temperatures of certain components within the system 100. As another example, the sensors 102 may detect electrical voltages or currents within the system 100. As yet another example, the sensors 102 may detect airflow within the system 100. The sensors 102 communicate the information detected by the sensors 102 to the controller 104. The controller 104 may use this information to determine the appropriate clock gapping to introduce into a clock signal for a particular component of the system 100. The sensors 102 may be positioned at any suitable location within the system 100 to detect any suitable characteristic of the system 100. If the system 100 is an IC, the sensors 102 may be positioned in the IC or mounted to or proximate the IC.

The controller 104 controls the operation of the components within the system 100. As seen in FIG. 1, the controller 104 includes a processor 112 and a memory 114, which are configured to perform any of the functions or actions of the controller 104 described herein. Generally, the controller 104 introduces clock gaps into clock signals 116 that are communicated to other components of system 100. In particular embodiments, the clock gaps reduce the effective clock rates of these components, which reduces the electrical power consumption of these components. If the system 100 is an IC, the controller 104 may be part of the IC. In some embodiments, the controller 104 is located on a different IC.

The processor 112 is any electronic circuitry, including, but not limited to microprocessors, application specific integrated circuits (ASIC), application specific instruction set processor (ASIP), and/or state machines, that communicatively couples to memory 114 and controls the operation of the controller 104. The processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 112 may include other hardware that operates software to control and process information. The processor 112 executes software stored on memory to perform any of the functions described herein. The processor 112 controls the operation and administration of the controller 104 by processing information (e.g., information received from the sensors 102, synchronous block 106, real-time block 108, and asynchronous block 110). The processor 112 may be a programmable logic device, a microcontroller, a microprocessor, any suitable processing device, or any suitable combination of the preceding. The processor 112 is not limited to a single processing device and may encompass multiple processing devices.

The memory 114 may store, either permanently or temporarily, data, operational software, or other information for the processor 112. The memory 114 may include any one or a combination of volatile or non-volatile local or remote devices suitable for storing information. For example, the memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 114, a disk, a CD, or a flash drive. In particular embodiments, the software may include an application executable by the processor 112 to perform one or more of the functions described herein.

The controller 104 may control the clocking of certain components of the system 100. For example, the controller 104 may introduce clock gaps into a clock signal 116. The controller 104 may then communicate the clock signal 116 with the clock gaps to a component of the system 100. The clock signal 116 then controls the operation or timing of that component. The controller 104 may determine the clock gaps to introduce into the clock signal 116 using information from the sensors 102 or the circuit components of the system 100. For example, the controller 104 may introduce clock gaps into the clock signal 116 based on temperature measurements communicated by the sensors 102. These temperature measurements may indicate the temperatures within system 100 or the temperatures of certain components within the system 100. As another example, the controller 104 may introduce clock gaps into the clock signal 116 based on electrical voltage or current measurements detected by the sensors 102. These measurements may represent the voltages across or the currents flowing through the system 100 or the components within the system 100. As yet another example, the controller 104 may add clock gaps into the clock signal 116, based on the data rates of particular components within the system 100. These data rates may indicate an amount of data flowing through these components.

The controller 104 may add clock gaps into the clock signal 116 based on one or more of these types of information. For example, if a component has a low temperature, a low data rate, or a low measured electrical voltage or current, then the controller 104 may determine that that component is not being utilized heavily. In response, the controller 104 may add clock gaps into the clock signal 116 to that component to reduce the effective clock rate for that component. As a result, the electrical power consumption of that component is reduced in certain embodiments. On the other hand, if a component of the system 100 has a high temperature, a high data rate, or a high measured electrical voltage or current, then the controller 104 may determine that that component is experiencing high utilization. In response, the controller 104 may not add or may add few clock gaps into the clock signal 116 for that component. As a result, the effective clock rate for that component is effectively maintained.

As discussed previously, the system 100 may be an integrated circuit. As seen in FIG. 1, the system 100 includes a synchronous block 106, a real-time block 108, and an asynchronous block 110. Each of these blocks include circuit components with different timing controls. Generally, the synchronous block 106 includes circuit components that operate based on the clock signal 116 communicated by the controller 104. The real-time block 108 operates based on the timing demands of an external system or circuit (e.g., an Ethernet interface). For example, the real-time block 108 may include circuit components that are interrupt driven. The asynchronous block 110 may include circuit components that operate asynchronously. Stated differently, the circuit components within the asynchronous block 110 may operate independently of the clock signal 116 and the circuit components in the real-time block 108. For example, the asynchronous block 110 may include circuit elements that do not operate based on clock signals or timing. Generally, the controller 104 adds clock gaps to a clock signal 116 that is communicated to circuit components within the synchronous block 106. The system 100 includes one or more shims 122 that interface between circuit components that use different clock signals 116 or have different effective clock rates due to clock gapping. In particular embodiments, the shims 122 allow the controller 104 to add different clock gapping to the clock signals 116 communicated to different circuit blocks within the synchronous block 106, which allows for finer control of different circuit blocks. One or more of the blocks 106, 108, and 110 may be implemented in the same IC or in different ICs.

The synchronous block 106 includes one or more circuit blocks 118. In the example of FIG. 1, the synchronous block 106 includes circuit blocks 118A, 118B, and 118C. The synchronous block 106 may include any number of circuit blocks 118. Each circuit block 118 may be configured to perform any desired function. The circuit blocks 118 may include any number of circuit components for processing inputs to generate outputs. The circuit components may be controlled by clock signals communicated by the controller 104.

The circuit block 118A receives a clock signal 120A from the controller 104. The clock signal 120A may include clock gaps added by the controller 104 based on characteristics of the circuit block 118A or characteristics detected by the sensors 102. These clock gaps may reduce the effective clock rate of the circuit block 118A. The circuit block 118A may then receive inputs and generate outputs based on the received clock signal 120A.

The circuit block 110B receives a clock signal 120B from the controller 104. The clock signal 120B may include clock gaps added by the controller 104, which reduce the effective clock rate of the circuit block 118B. The controller 104 may determine these clock gaps, based on characteristics of the circuit block 118B, or the characteristics detected by the sensors 102. The circuit block 118B may receive inputs and generate outputs according to the clock signal 120B.

The circuit block 118C receives a clock signal 120C from the controller 104. The clock signal 120C may include clock gaps added by the controller 104, which reduce the effective clock rate of the circuit block 118C. The controller 104 may determine the clock gaps based on characteristics of the circuit block 118C, or characteristics detected by the sensors 102. The circuit block 118C may receive inputs and generate outputs according to the clock signal 120C.

The controller 104 adds clock gaps to a clock signal 120 by suppressing one or more clock edges or pulses within the clock signal 120. The controller 104 may suppress any suitable number of clock edges or pulses within the clock signal 120 so that the effective clock rate of the clock signal 120 is reduced to a desired level. The more clock edges or pulses that the controller 104 suppresses, the more the effective clock rate is reduced.

The controller may introduce a different number of clock gaps for different circuit blocks 118. For example, the controller 104 may determine that different circuit blocks 118 are being utilized differently and may therefore have their clock signals 120 reduced by different amounts. In response, the controller 104 adds a different number of clock gaps into the clock signals 120 for the different circuit blocks 118, which may cause the different circuit blocks 118 to have different effective clock rates.

In particular embodiments the controller 104 may determine the clock gaps to be added to a clock signal 120 based on user input. For example, a user may specify a certain effective clock rate for a circuit block 118. In response, the controller 104 may add the suitable number of clock gaps to the clock signal 120 to reduce the effective clock rate for that circuit block 118 to the desired effective clock rate.

In particular embodiments, the circuit block 118C may receive input from the circuit block 118B. For example, the circuit block 118B may generate output and communicate that output to the circuit block 118C. The circuit block 118C may then process that input to generate its output. A shim 122A may be positioned between the circuit block 118B and the circuit block 118C. The shim 122A may include circuit components that allow information to be communicated from the circuit block 118B to the circuit block 118C, even though the circuit block 118B may have a different effective clock rate than the circuit block 118C. For example, the shim 122A may include buffers, registers, switches, or latches that adjust the output of the circuit block 118B so that the information within the output can be received properly by the circuit block 118C using a different effective clock rate. If the circuit block 118B has a lower effective clock rate than the circuit block 118C, then when the circuit block 118B communicates its output to the shim 122A, that output may last longer than a clock cycle in the circuit block 118C. If the circuit block 118B communicated that output directly to the circuit block 118C (i.e., with no shim 122A), then the circuit block 118C may incorrectly perceive the circuit block 118B as having communicated the same output multiple times. The shim 122A may prevent this incorrect perception by stopping the output from being communicated to the circuit block 118C after one clock cycle in the circuit block 118C. In this manner, the circuit block 118C perceives the output from the circuit block 118B as being communicated only once. As a result of the shim 122A, the circuit block 118B and the circuit block 118C may use different clock gapping, or different effective clock rates, and information may still be communicate between these circuit blocks 118B and 118C. In this manner, the controller 104 may reduce the electrical power consumption of the circuit blocks 118 independently of other circuit blocks 118, even if information needs to be communicated between the circuit blocks 118.

The system 100 may further include shims 122B, 122C, and 122D. These shims may be positioned between the synchronous block 106 and the real-time block 108. The shim 122B may be positioned between the circuit block 118A and the real-time block 108. The shim 122C may be positioned between the circuit block 118B and the real-time block 108. The shim 122D may be positioned between the circuit block 118C and the real-time block 108. Generally, the shims 122B, 122C, and 122D allow the outputs of the circuit blocks 118A, 118B, and 118C to be communicated to the real-time block 108, even though the circuit blocks 118A, 118B, and 118C may use different clocking than the components of the real-time block 108. For example, the shims 122B, 122C, and 122D may include buffers, registers, switches, latches, or other suitable circuit components that adjust the output of the circuit blocks 118A, 118B, and 118C so that these outputs can be received according to the timing of the real-time block 108.

For example, the shims 122B, 122C, and 122D may delay or stop an output from the circuit blocks 118A, 118B, and 118C from reaching the real-time block 108 after one of the real-time block's 108 clock cycles, even though the circuit blocks 118A, 118B, and 118C continue generating this output after the one clock cycle. This situation may occur when one or more of the circuit blocks 118A, 118B, and 118C have a lower effective clock rate than the real-time block 108. As discussed above, in these situations, when the circuit blocks 118A, 118B, and 118C communicate their outputs over one their clock cycles, the outputs may be communicated for more than one of the real-time block's 108 clock cycles. As a result, the real-time block 108 may incorrectly perceive the output as being communicated multiple times. The shims 122B, 122C, and 122D may stop the output from being communicated after one of the real-time block's 108 clock cycles to prevent the real-time block 108 from incorrectly perceiving multiple instances of the output as being communicated. In this manner, even if the circuit blocks 118A, 118B, and 118C operate at a slower effective clock rate than the components of the real-time block 108, the real-time block 108 does not perceive the circuit blocks 118A, 118B, and 118C as generating continuous redundant output. In this manner, the shims 122B, 122C, and 122D allow for information to be communicated from the circuit blocks 118A, 118B, and 118C to the real-time block 108, even though the circuit blocks 118A, 118B, and 118C may operate at a lower effective clock rate than the components of the real-time block 108.

In particular embodiments, the controller 104 may add clock gaps to the clock signal 116 based on characteristics of other circuit blocks 118. For example, the controller 104 may add clock gaps to the clock signal 120C communicated to the circuit block 118C based on the clock gapping used for the clock signal 120B communicated to the circuit block 118B. In this manner, the controller 104 may determine that the clock gapping between two circuit blocks 118 are related or dependent upon each other. For example, the controller 104 may determine that the clock signal 120B should be at least twice as fast as the clock signal 120C. As a result, the controller 104 may determine the clock gaps added to the clock signal 120B and add twice the amount of clock gaps to the clock signal 120C. In this manner, the clock signal 120C communicated to the circuit block 118C is dependent upon the clock signal 120B communicated to the circuit block 118B. Additionally, the clock gapping added to the clock signal 120C may further depend upon the characteristics of the system 100 or the circuit block 118C (e.g., the temperature of the system 100, the temperature of the circuit block 118C, or the data rate of the circuit block 118C).

Figure 2:
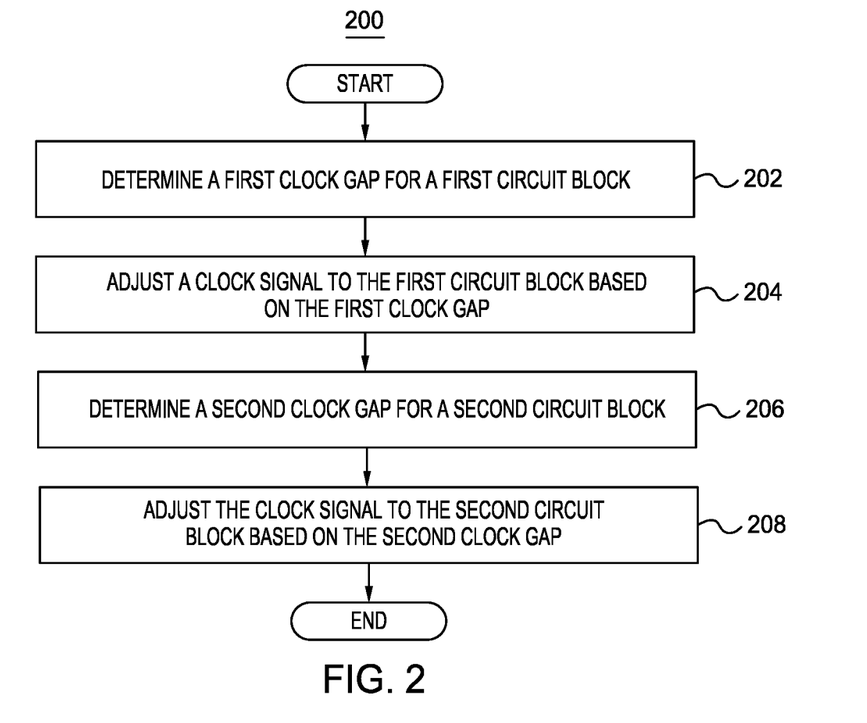
FIG. 2 is a flowchart of an example method in the system of FIG. 1.

FIG. 2 is a flowchart of an example method 200 in the system 100 of FIG. 1. Generally, the controller 104 performs the method 200. In particular embodiments, by performing the method 200, the controller 104 reduces the electrical power consumption of the system 100.

In block 202, the controller 104 determines a first clock gap for a first circuit block 118 (e.g., the circuit block 118B). The controller 104 may determine the first clock gap based on any suitable characteristics. For example, the controller 104 may determine the first clock gap based on a data rate of the first circuit block 118B, a temperature of the system 100 or the first circuit block 118B, or an electrical voltage or current in the first circuit block 118B. For example, if the first circuit block 118B has a low data rate, then the controller 104 may determine that the first circuit block 118B is not being utilized, and may, therefore, use a lower effective clock rate. In response, the controller 104 may determine a large number of clock gaps for the first circuit block 118B. As another example, the controller 104 may determine that the first circuit block 118B has a low temperature, which indicates that the first circuit block 118B is not being utilized heavily. In response, the controller 104 may determine that the first circuit block 118B may have its effective clock rate reduced. The controller 104 may then determine a large number of clock gaps for the first circuit block 118B.

On the other hand, if the controller 104 determines that the first circuit block 118B has a high data rate, which indicates that the first data block 118B is being heavily utilized, then the controller 104 may determine a low number of clock gaps or no clock gaps to be used for the first circuit block 118B. As another example, if the controller 104 determines that the first circuit block 118B has a high temperature, which indicates that the first circuit block 118B is being heavily utilized, then the controller 104 may determine a low number of clock gaps or no clock gaps to be used for the first circuit block 118B.

In block 204, the controller 104 adjusts a clock signal 120 to the first circuit block 118B based on the determined first clock gap. For example, the controller 104 may suppress certain clock edges or pulses within a clock signal 120B communicated to the first circuit block 118B, such that the effective clock rate of that clock signal 120B is reduced. The more clock gaps that should be added, the more clock edges or pulses the controller 104 suppresses within the clock signal 120B. In particular embodiments, by suppressing these clock edges or pulses and lowering the effective clock rate of the clock signal 120B, the controller 104 reduces the electrical power consumption of the first circuit block 118B.

In block 206, the controller determines a second clock gap for a second circuit block 118 (e.g., the circuit block 118C). The controller 104 may determine the second clock gap based on characteristics of the system 100 or the second circuit block 118C. For example, the controller 104 may determine the second clock gap based on the data rate in the second circuit block 118C. If the second circuit block 118C has a low data rate, which indicates that the second circuit block 118C is not being utilized, then the controller 104 may determine that the second circuit block 118C may have its effective clock rate reduced. In response, the controller 104 may determine that clock gaps should be added to the clock signal 120C to the second circuit block 118C. As another example, if the temperature of the second circuit block 118C is low, which indicates that the second circuit block is not being utilized, then the controller 104 may determine that the effective clock rate for the second circuit block 118C may be reduced. In response, the controller 104 may determine clock gaps to be added to the clock signal 120C for the second circuit block 118C.

On the other hand, if the controller 104 determines that the second circuit block 118C has a high temperature, which indicates that the second circuit block 118C is being heavily utilized, then the controller 104 may determine that few or no clock gaps should be added to the clock signal 120C for the second circuit block 118C. As a result, the second circuit block 118C would not experience a reduction in its effective clock rate. As another example, if the controller 104 determines that the second circuit block 118C has a high data rate, which indicates that the second circuit block 118C is being heavily utilized, then the controller 104 may determine that the second circuit block 118C should not operate with a reduced effective clock rate. In response, the controller 104 may determine that few or no clock gaps should be added to a clock signal 120C to the second circuit block 118C.

In particular embodiments, the controller 104 may determine the clock gaps to be added to a clock signal 120C to the second circuit block 118C further based on the first clock gap determined for the first circuit block 118B. For example, the controller 104 may determine that the clock signal 120C to the second circuit block 118C should be at most half the speed of the clock signal 120B communicated to the first circuit block 118B. As a result, the controller 104 may determine that the second clock gap should include twice as many clock gaps as the first clock gap. As another example, the controller 104 may determine that the clock signal 120C to the second circuit block 118C should be at least twice the frequency of the clock signal 120B to the first circuit block 118B. In response, the controller 104 may determine that the second clock gap should include half as many clock gaps as the first clock gap for the first circuit block 118.

In block 208, the controller 104 adjusts the clock signal 120 to the second circuit block 118C based on the second clock gap. For example, the controller 104 may add the clock gap to the clock signal 120C, which reduces the effective clock rate of the clock signal 120C to the second circuit block 118C. In particular embodiments, by reducing the effective clock rate of the second circuit block 118C, the controller 104 reduces the electrical power consumption of the second circuit block 118C.

Figure 3:
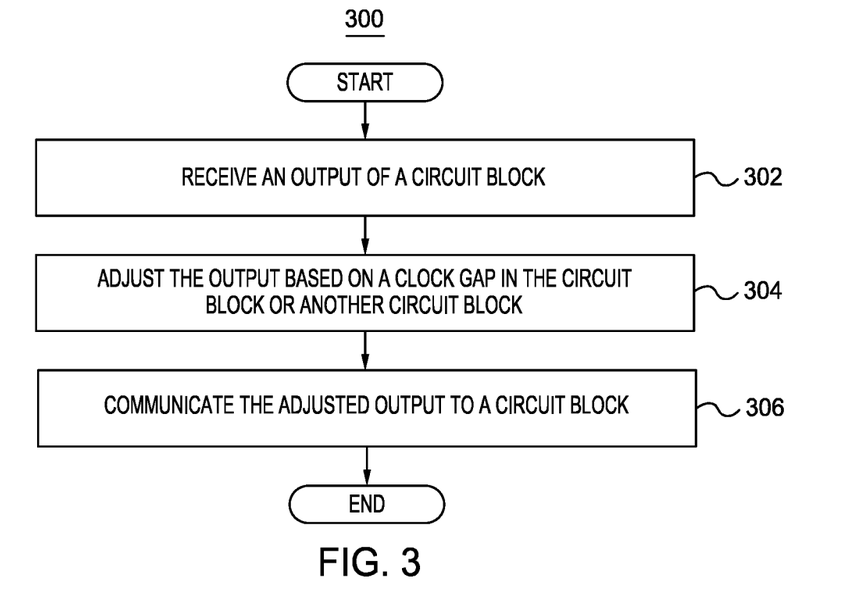
FIG. 3 is a flowchart of an example method in the system of FIG. 1.

FIG. 3 is a flowchart of an example method 300 in the system 100 of FIG. 1. Generally, one or more shims 122 (e.g., the shim 122A) perform the method 300. In particular embodiments, by performing the method 300, the shims 122 allow for information to be communicated between blocks that have different effective clock rates. Additionally, the shims 122 allow different blocks within the system 100 to have different clock gapping added to the clock signals for these blocks. The clock gapping may have been determined and added according to the example method 200 shown in FIG. 2.

In block 302, a shim 122A receives a data output of a circuit block 118 (e.g., circuit block 118B). The circuit block 118B may have generated the output by processing a received input according to a clock signal 120B. The clock signal 120B may have clock gaps added by the controller 104, based on one or more characteristics of the circuit block 118B or the system 100. For example, the controller 104 may determine the clock gaps based on a data rate of the circuit block 118B, a temperature of the circuit block 118B, an electrical voltage or current of the circuit block 118B, or user input.

In block 304, the shim 122A adjusts the output based on a clock gap in the circuit block 118B or another circuit block 118 (e.g., circuit block 118C). As discussed previously, the two circuit blocks 118B and 118C may have different effective clock rates because the controller 104 may determine different clock gaps for these circuit blocks 118B and 118C. As a result of the different effective clock rates, it may not be possible for the two circuit blocks 118B and 118C to communicate with each other. For example, if the circuit block 118B has a lower effective clock rate than the circuit block 118C, then when the circuit block 118B communicates output over one of its own clock cycles to the circuit block 118C, the circuit block 118C may incorrectly perceive the output as being communicated multiple times over multiple clock cycles.

The shim 122A may adjust the output from the circuit block 118B so that the circuit block 118C correctly perceives the output. For example, the shim 122A may delay or stop the output after one clock cycle of the circuit block 118C, even though the circuit block 118B continues producing that output after the one clock cycle. In this manner, the shim 122A allows the output to be communicated to another block 118C of the system 100 that uses a faster effective clock rate without that block 118C interpreting the output as multiple copies of redundant output. As another example, the shim 122A may extend or lengthen the duration of the output past one clock cycle of the circuit block 118B, even though the circuit block 118B stops producing that output after the one clock cycle. In this manner, the shim 122A ensures that another block 118C of the system 100 that uses a slower effective clock rate properly receives the output.

In block 306, the shim 122A communicates the adjusted output so that the circuit block 118C can properly receive the output that was generated according to a lower effective clock rate.

The shims 122B, 122C, and 122D may also perform the method 300 so that the circuit blocks 118 in the synchronous block 106 may communicate output to the real-time block 108. For example, the shim 122B may adjust an output of the circuit block 118A based on the clock gapping in the clock signal 120A so that the real-time block 108 may correctly perceive the output of the circuit block 118A. As another example, the shim 122C may adjust an output of the circuit block 118B based on the clock gapping in the clock signal 120B so that the real-time block 108 may correctly perceive the output of the circuit block 118B. As another example, the shim 122D may adjust an output of the circuit block 118C based on the clock gapping in the clock signal 120C so that the real-time block 108 may correctly perceive the output of the circuit block 118C. Each of these shims 122B, 122C, and 122D may, for example, stop an output from their corresponding circuit blocks 118 after one clock cycle of the real-time block 108, even though the circuit blocks 118 continue producing that output after that one clock cycle. In this manner, the real-time block 108 does not incorrectly perceive multiple communications of the outputs.

Figure 4:
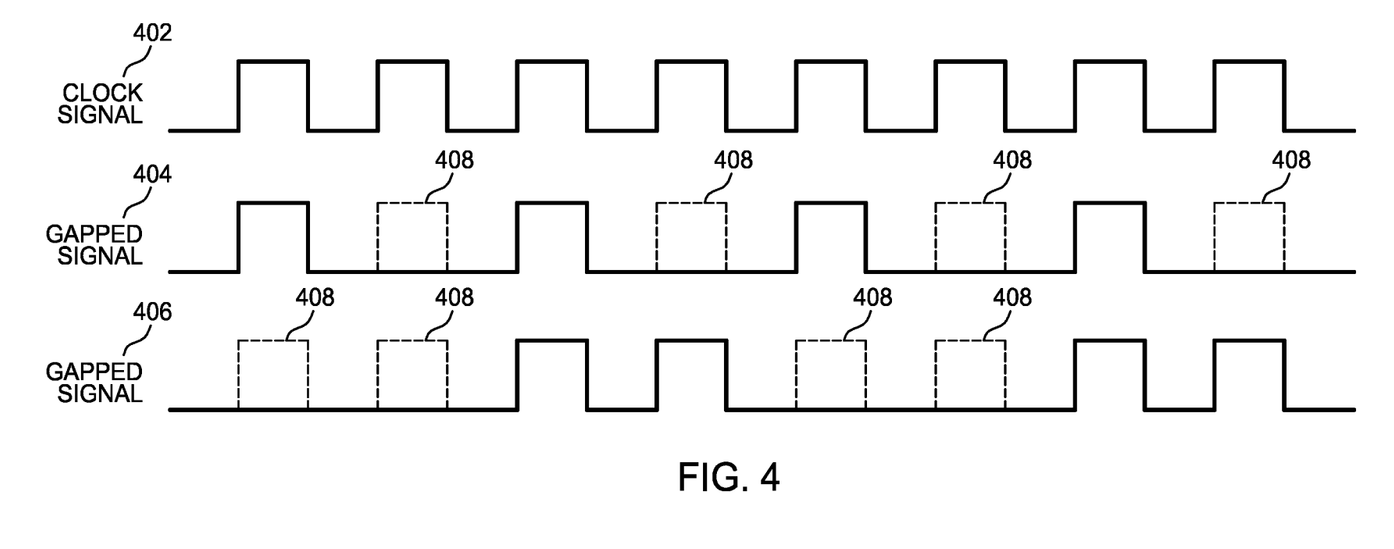
FIG. 4 illustrates example clock signals in the system of FIG. 1.

FIG. 4 illustrates example clock signals in the system 100 of FIG. 1. The controller 104 may generate each of the clock signals shown in FIG. 4. The clock signal 402 may be the same as the clock signal 116, which may have no clock gaps. The controller 104 may add clock gaps by suppressing clock edges or pulses in the clock signal 116 to produce the clock signals 404 and 406.

The controller 104 generates the clock signal 404 by suppressing every other clock pulse in the clock signal 402. As a result, the clock signal 404 is 50% gapped and has an effective clock rate that is half of the clock rate of the clock signal 402. The controller 104 generates the clock signal 406 by suppressing every other pair of clock pulses in the clock signal 402. As a result, the clock signal 406 is also 50% gapped and has an effective clock rate that is half of the clock rate of the clock signal 402. Even though the clock signals 404 and 406 are 50% gapped, these clock signals 404 and 406 are different from one another. Additionally, although the example of FIG. 4 shows the clock signals 404 and 406 having periodic gaps, the controller 104 may gap the clock signal 402 in a non-periodic manner. Moreover, the controller 104 may add any number of gaps to the clock signal 402 to produce a clock signal with any suitable effective clock rate.

In summary, this disclosure describes a controller 104 that adds clock gaps to the clock signals 120 used to control different synchronous circuit blocks 118 of a circuit (e.g., an IC). The controller 104 may determine the clock gaps for a circuit block 118 based on one or more factors (e.g., a temperature of the IC or the circuit block 118, an electrical voltage or current of the circuit block 118, a data rate of the circuit block 118, or user input). The controller 104 may add the clock gaps when one or more of these factors indicate that the circuit block 118 may have its effective clock rate reduced. By reducing the effective clock rate, the controller 104 reduces the electrical power consumption of these circuit blocks 118.

Additionally, the circuit may include shims 122 that allow for different components that have different effective clock rates (e.g., due to the clock gapping introduced by the controller 104) to communicate with one another. The shims 122 may, for example, stop or delay an output from a circuit block 118 with a lower effective clock rate to a component with a higher effective clock rate, so that the component does not perceive the output as being communicated multiple times. As a result, the shims 122 allow the controller 104 to control the clock gapping in different components of the circuit independently, which allows for the controller 104 to reduce the electrical power consumption of different components independently, in certain embodiments.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
    determining a first clock gap for a first block of an integrated circuit based on a performance factor of the first block or an external factor;
    adjusting a clock signal to the first block based on the first clock gap;
    determining a second clock gap for a second block of the integrated circuit based on (i) the first clock gap and (ii) a performance factor of the second block or the external factor, the second clock gap is different from the first clock gap; and
    adjusting the clock signal to the second block based on the second clock gap.

2. The method of claim 1, wherein the performance factor of the first block comprises a data rate of the first block.

3. The method of claim 1, wherein the external factor comprises a temperature of the integrated circuit.

4. The method of claim 1, further comprising adjusting an output of the first block based on the first clock gap before sending the output to a third block of the integrated circuit.

5. The method of claim 4, wherein adjusting the output comprises stopping the output from reaching the third block after one clock cycle even though the first block continues generating the output after the one clock cycle.

6. The method of claim 1, further comprising adjusting an output of the first block based on the first clock gap or the second clock gap before sending the output to the second block.

7. The method of claim 1, further comprising determining a third clock gap for the first block based on user input.

8. A system comprising:
    a first block of an integrated circuit;
    a second block of the integrated circuit; and
    a hardware processor configured to:
        determine a first clock gap for the first block based on a performance factor of the first block or an external factor;
        adjust a clock signal to the first block based on the first clock gap;
        determine a second clock gap for the second block based on (i) the first clock gap and (ii) a performance factor of the second block or the external factor, the second clock gap is different from the first clock gap; and
        adjust the clock signal to the second block based on the second clock gap.

9. The system of claim 8, wherein the performance factor of the first block comprises a data rate of the first block.

10. The system of claim 8, wherein the external factor comprises a temperature of the integrated circuit.

11. The system of claim 8, further comprising a shim in the integrated circuit configured to adjust an output of the first block based on the first clock gap before sending the output to a third block of the integrated circuit.

12. The system of claim 11, wherein adjusting the output comprises stopping the output from reaching the third block after one clock cycle even though the first block continues generating the output after the one clock cycle.

13. The system of claim 8, further comprising a shim configured to adjust an output of the first block based on the first clock gap or the second clock gap before sending the output to the second block.

14. The system of claim 8, wherein the hardware processor is further configured to determine a third clock gap for the first block based on user input.

15. The system of claim 8, wherein the hardware processor is in the integrated circuit.

16. An integrated circuit comprising:
a synchronous block comprising a first circuit block and a second circuit block; and
a controller configured to:
  determine a first clock gap for the first circuit block based on a performance factor of the first circuit block or an external factor;
  adjust a clock signal to the first circuit block based on the first clock gap;
  determine a second clock gap for the second circuit block based on (i) the first clock gap and (ii) a performance factor of the second circuit block or the external factor, the second clock gap is different from the first clock gap; and
  adjust the clock signal to the second circuit block based on the second clock gap.

17. The integrated circuit of claim 16, wherein the performance factor of the first circuit block comprises a data rate of the first circuit block.

18. The integrated circuit of claim 16, wherein the external factor comprises a temperature of the integrated circuit.

19. The integrated circuit of claim 16, further comprising:
a real-time block; and
a shim configured to adjust an output of the first circuit block based on the first clock gap before sending the output to the real-time block.

20. The integrated circuit of claim 19, wherein adjusting the output comprises stopping the output from reaching the real-time block after one clock cycle even though the first circuit block continues generating the output after the one clock cycle.

* * * * *